US012679276B2

(12) United States Patent
Kling

(10) Patent No.: US 12,679,276 B2
(45) Date of Patent: Jul. 14, 2026

(54) STORAGE DEVICE FOR SECURELY STORING OBJECTS IN A MOTOR VEHICLE

(71) Applicant: Dr. Ing. h.c. F. Porsche Aktiengesellschaft, Stuttgart (DE)

(72) Inventor: Achim Kling, Neuweiler-Agenbach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 331 days.

(21) Appl. No.: 18/600,995

(22) Filed: Mar. 11, 2024

(65) Prior Publication Data

US 2024/0326700 A1     Oct. 3, 2024

(30) Foreign Application Priority Data

Mar. 29, 2023    (DE) ..................... 10 2023 107 920.4

(51) Int. Cl.
*B60R 7/00*          (2006.01)
*B60N 3/10*          (2006.01)
*B60R 7/04*          (2006.01)

(52) U.S. Cl.
CPC ............... B60R 7/04 (2013.01); B60N 3/101 (2013.01)

(58) Field of Classification Search
CPC .................................. B60R 7/04; B60N 3/101
USPC ...................................................... 296/24.34
See application file for complete search history.

(56) References Cited

U.S. PATENT DOCUMENTS

| | | | | |
|---|---|---|---|---|
| 4,832,241 | A | * | 5/1989 | Radcliffe ................ B60R 7/043 224/544 |
| 4,938,401 | A | * | 7/1990 | Weisbrodt ............... B60R 7/043 224/544 |
| 9,096,177 | B2 | * | 8/2015 | Boundy .................... B60R 7/04 |
| 11,377,039 | B2 | * | 7/2022 | Ugrin ..................... A63G 31/00 |
| 2005/0211741 | A1 | | 9/2005 | Holmberg |
| 2022/0153178 | A1 | | 5/2022 | Schmid |

FOREIGN PATENT DOCUMENTS

| | | |
|---|---|---|
| DE | 102012020976 | 4/2014 |
| DE | 102017005189 | 12/2018 |

OTHER PUBLICATIONS

German Search Report dated Nov. 24, 2023.

* cited by examiner

*Primary Examiner* — Steven O Douglas
(74) *Attorney, Agent, or Firm* — LEYDIG, VOIT & MAYER, LTD.

(57) ABSTRACT

A storage device (10) for an interior of a motor vehicle is provided with a storage compartment (12) opened in the Z-direction for storing objects. The storage compartment (12) has a first side wall (16) located substantially in an X-Z plane. A tensioning belt (26) is arranged in the storage compartment (12) for pressing a flat device (28) against the first side wall (16) and for supporting weight forces of the flat device (28). The first side wall (16) and/or a floor region of the storage compartment (12) adjoining the side wall (16) are padded. The padding in the storage compartment (12) of the storage device (10) prevents damage to the flat device (28) even with high acceleration forces, so that objects can be securely stored in an interior of a motor vehicle.

12 Claims, 1 Drawing Sheet

STORAGE DEVICE FOR SECURELY STORING OBJECTS IN A MOTOR VEHICLE

CROSS-REFERENCE TO RELATED APPLICATION

This application claims priority on German Patent Application No 10 2023 107 920.4 filed Mar. 29, 2023, the entire disclosure of which is incorporated herein by reference.

BACKGROUND

Field of the Invention

The invention relates to a storage device, in particular a center console, for an interior of a motor vehicle with the help of which objects can be stored.

Related Art

DE 10 2012 020 976 A1 discloses a center console for an interior of a motor vehicle is known. The center console has a storage compartment that can receive a tablet computer. The storage compartment also an elastic band that is intended to press the tablet computer against an inner side wall of the storage compartment.

There is a constant need to store objects securely within an interior of a motor vehicle. Accordingly, it is an object of the invention to enable secure storing of objects in an interior of a motor vehicle.

SUMMARY OF THE INVENTION

An aspect of the invention relates to a storage device for an interior of a motor vehicle, with a storage compartment opened in the Z-direction for storing objects. The storage compartment comprises a first side wall located substantially in an X-Z plane, and a tensioning belt arranged in the storage compartment for pressing a flat device against the first side wall and for supporting weight forces of the flat device. The first side wall and/or a floor region of the storage compartment adjoining the side wall is padded.

Devices carried in a motor vehicle are becoming more fragile and valuable. Thus, previous storage principles that were designed for more robust objects can no longer be sufficient. Fragile and valuable devices that are carried in a motor vehicle often are flat devices characterized by a small thickness compared to their flat extension, and there is a risk that the flat device can be broken over a long length and a small thickness. These flat fragile devices often have a screen or display that extends over a large part of the flat surface, and the screen or display usually comprises a rather stiff and/or brittle material, for example glass, that can break easily. The flat device can be an electronic display device, for example a tablet computer, a smartphone, a laptop, or the like.

Storing the flat device by pressing the flat device against a support surface with the aid of an elastic band does not necessarily provide sufficient security, and damage to the flat device cannot be ruled out. For example, lateral forces act on a motor vehicle when cornering, and these lateral forces can overcome the pressing force of an elastic band that is intended to secure the flat device. Additionally, the lateral forces cease, for example at the end of cornering. Thus, the elastic band snaps back and the flat device is hit with force against the support surface of a storage compartment. Walls of the storage compartment usually are made of a hard plastic that can damage the flat device. High transverse forces can occur when cornering at least in a sports car that often is driven at high performance, so that the risk of damage to the flat device cannot be ignored.

The padding of the first side wall and/or the floor region adjoining the side wall allows the flat device to rest against the padding from the tensioning belt and/or its own weight and to sink somewhat elastically into the padding. The padding can follow the displacement of the flat device caused by acceleration forces that are applied to the flat device during a high-performance drive. Thus, a damped return movement of the flat device can take place when the tensioning belt snaps back, thereby preventing a hard impact. Instead of a hard impact, the padding is deformed gradually by building up an elastic return force so that kinetic energy can be dissipated. The padding in the storage compartment of the storage device prevents damage to the flat device, even with high acceleration forces, so that objects can be stored securely in an interior of a motor vehicle.

An X-direction is understood to mean a coordinate direction along a longitudinal axis of a motor vehicle when the storage device is installed in the motor vehicle. The X-direction extends substantially horizontally when the motor vehicle is parked on a flat horizontal surface. A Y-direction is understood to mean a coordinate direction along a transverse axis of a motor vehicle when the storage device is installed in the motor vehicle. The Y-direction extends substantially horizontally when the motor vehicle is parked on a flat horizontal surface. A Z-direction is understood to mean a coordinate direction along a vertical axis of a motor vehicle when the storage device is installed in the motor vehicle. The Z-direction extends substantially vertically when the motor vehicle is parked on a flat horizontal surface. The X-direction, the Y-direction, and the Z-direction are oriented orthogonally to one another. An X-Y plane is understood to mean a plane that is spanned by the X-direction and by the Y-direction and is arranged at a certain height in the Z-direction. An X-Z plane is understood to mean a plane that is spanned by the X-direction and by the −Z direction and is arranged at a certain width in the Y-direction. A Y-Z plane is understood to mean a plane that is spanned by the Y-direction and by the Z-direction and is arranged at a certain length in the X-direction.

The storage device can be configured as a center console that can be arranged between a driver seat and a passenger seat in the interior of the motor vehicle and may abut and/or be fastened to a dashboard in the X-direction. However, the storage device can also be provided in an interior component, an inner door trim panel, an armrest, a trunk, or the like.

The tensioning belt can be an elastic band fastened on both ends in the storage compartment. Additionally, or alternatively, the effective length of the tensioning belt can be adjusted to influence a pre-tension within the tensioning belt. If a flat device is not inserted between the first side wall and the tensioning belt, the tensioning belt can rest flat against the first side wall. The tensioning belt may be spaced apart from the first side wall in the Y-direction when the flat device is not in use, in particular spaced far enough apart that the flat device can be threaded easily between the first side wall and the tensioning belt. In some embodiments, the tensioning belt is grounded, such that static electricity from the flat device can be discharged.

The storage compartment may be made from a hard plastic that is rather stiff and brittle. In principle, the storage compartment can be configured in one piece with a base body of the remaining storage device. Thus, the storage compartment can be manufactured easily and inexpensively during manufacture of the base body by plastic injection molding. The storage compartment of some embodiments is configured in multiple pieces. Individual parts may be manufactured separately by plastic injection molding and then fixedly connected to one another. These initially separate parts of the storage compartment may be connected in a material-locking manner, for example by welding. Individual plastic or thermoplastic parts can be welded together in particularly simple and energy-saving manner so that joints between the individual parts are not visible or are barely visible.

The padding can be made of a soft and/or elastic material to cover the surfaces of the storage compartment that would otherwise touch the flat device. In some embodiments, the padding provides a soft and/or cushioning feel. The entire surface of the storage volume of the storage compartment need not be padded. Rather, padding may be provided on only those surfaces of the first side wall and/or the bottom of the storage compartment with which the flat device would otherwise contact. Thus, the storage volume of the storage compartment is not affected by unnecessary padding.

An elastic padding force that can be provided by the first side wall and a pressing force that can be provided by the tensioning belt up to a predetermined maximum thickness of the flat device may be substantially in a force equilibrium in a stored position of the flat device between the first side wall and the tensioning belt. The cushioning force applied by the padding of the first side wall, and the pressing force applied by the tensioning belt in the opposite direction can essentially be of the same magnitude and may differ, for example, by only up to 25% or up to 10%. Thus, the flat device held between the first side wall and the tensioning belt can float between the first side wall and the tensioning belt without achieving maximum deformation of the padding or the tensioning belt. This results in a very soft accommodation of the flat device and allows elastic and soft yielding in both Y-directions. In addition, the flat device easily can be threaded between the first side wall and the tensioning belt without having to overcome excessive forces from the padding and/or the tensioning belt.

A storage volume of the storage compartment is limited in the Y-direction by the first side wall and by a second side wall that is spaced from the first side wall in the Y-direction and lies substantially in an X-Z plane. The first side wall and the second side wall may have substantially planar inner sides lying in the X-Z plane. The storage compartment can be symmetrical and may comprise an axis of symmetry extending in the X-direction and/or an axis of symmetry extending in the Y-direction. The second side wall may have a tensioning belt for storing a flat device on the surface of the second side wall in the same way as the first side wall described above and may have a mirror-image padding. Preferably, the tensioning belt is only provided on the first side wall. This exploits the fact that only one flat device usually needs to be stored. If two or more flat devices are to be stored, it is usually possible to arrange the flat devices in a row in the Y-direction and store them together between the first side wall and the tensioning belt.

In some embodiments, the first side wall and the second side wall are spaced apart from each other at least over a large part of the Z-direction by a fixture-free intermediate space. Thus, additional intermediate walls that divide the storage volume of the storage compartment into partial volumes are avoided. This also allows for storage of larger and/or bulky objects in the storage compartment. The flat device can be pressed on the first side wall or on the padding of the first side wall, such that the space required for storing the flat device can be minimized and storage of a larger object in the storage compartment is almost unaffected. If no flat device is inserted between the first side wall and the tensioning belt, it is also possible to release the storage volume otherwise occupied by the flat device, for example by a bulky object inserted in the storage compartment pressing the tensioning belt against the first side wall.

At least one cup holder can be provided in a contour that is formed offset to the tensioning strap in the Y-direction on a bottom of the storage compartment. The contouring for the cup-holder can be shaped at least partially in the circumferential direction of a beverage container to be inserted in the cup holder, such that the beverage container can be held securely. The contour for the cup holder can be tapered downwards in the Z-direction, such that beverage containers of different diameters can be held securely. The beverage container held in the cup holder, for example a cup or can, can intuitively support a threading of the flat device between the first side wall and the tensioning belt, and can reduce the risk of the flat device tilting during threading.

A rear side of the contour facing the first side wall is formed for threading the flat device and/or for supporting weight forces of the flat device, and this rear side may be padded. The rear side of the contour facing away from the beverage container can function to hold the flat device better. For example, the flat device can be slid along a beveled surface on the rear of the contour during storage and guided towards the first side wall. The flat device can be wedged between the rear side of the contour, which is preferably tapered in the Z-direction, thereby improving the hold of the flat device when stored. The padding of the rear side can also prevent damage to the flat device even if it hits the rear side.

Padding provided for placement against the flat device comprises an elastic material, in particular a nonwoven material and/or a thermoplastic elastomer (TPE) and/or a rubber material and/or a foam material. The elastic material may be laminated with a fabric and/or a protective layer and/or a film. This elastic material provides sufficient support against acceleration forces that occur during cornering, transfers forces to the material of the storage compartment and ensures a soft damping that prevents damage to the flat device when acceleration forces occur.

An opening of the storage compartment facing in the Z-direction can be closed by a cover. The cover is configured to move between a closed position for closing the opening and an open position for accessing the opening by displacement e.g. in the X-direction, and/or by pivoting around a pivot axis extending e.g. in the Y-direction. The cover ensures that objects stored in the storage compartment will not fall out. In particular, a tablet computer or other flat device held between the first side wall and the tensioning belt can have an dimension in the Z-direction that corresponds approximately to the dimension in the Z-direction of the storage volume of the storage compartment in this area. The cover can thereby form an upper stop for the flat device in the Z-direction. As a result, a movement of the flat device against the direction of gravity, for example, when driving over a bump, can be limited. Padding may be provided on a region of the cover that faces the flat device when the cover is in the closed position. In particular, the cover can push the flat device down into a recessed position from the top to the bottom and held in place with as little play as possible in the Z-direction.

A charging structure for connecting and/or electrically charging the flat device can be provided in the storage compartment. The charging structure, enables electronic devices, such as the flat device held between the first side wall and the tensioning belt, to be supplied with electrical power, for example, to charge a cell phone or a tablet computer. The device connected to the charging structure can provide an additional function for the driver and/or the passenger. Alternatively, the device placed in the storage compartment and connected to the charging structure can be covered by the cover in the closed position to prevent the driver from being distracted.

Another aspect of the invention relates to an assembly for an interior of a motor vehicle, having a driver seat, a front passenger seat, and a storage device provided in the Y-direction between the driver seat and the front passenger seat. The storage device can be configured as described above. The padding in the storage compartment of the storage device prevents damage to the flat device, even with high acceleration forces so that objects can be stored securely in an interior of a motor vehicle.

An embodiment of the invention is explained below with reference to the accompanying drawings. Features presented hereinafter can represent an aspect of the invention both individually and in combination.

DETAILED DESCRIPTION

Figure 1:
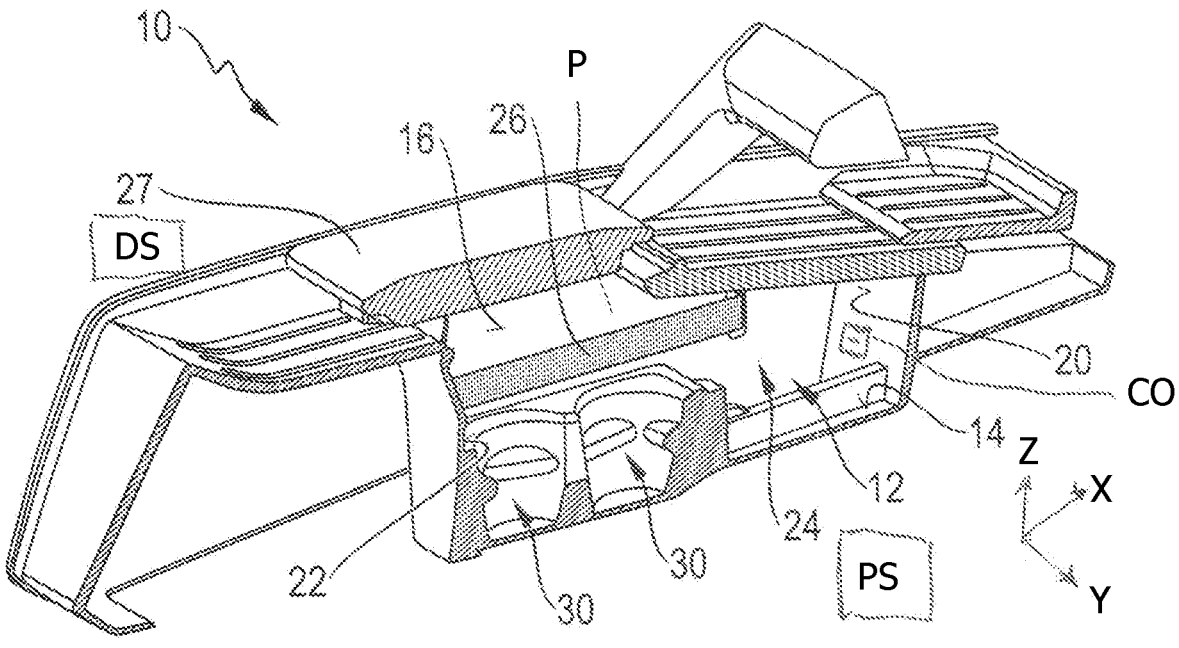
FIG. 1 is a schematic perspective cross-sectional view of a storage device configured as a center console.
Figure 2:
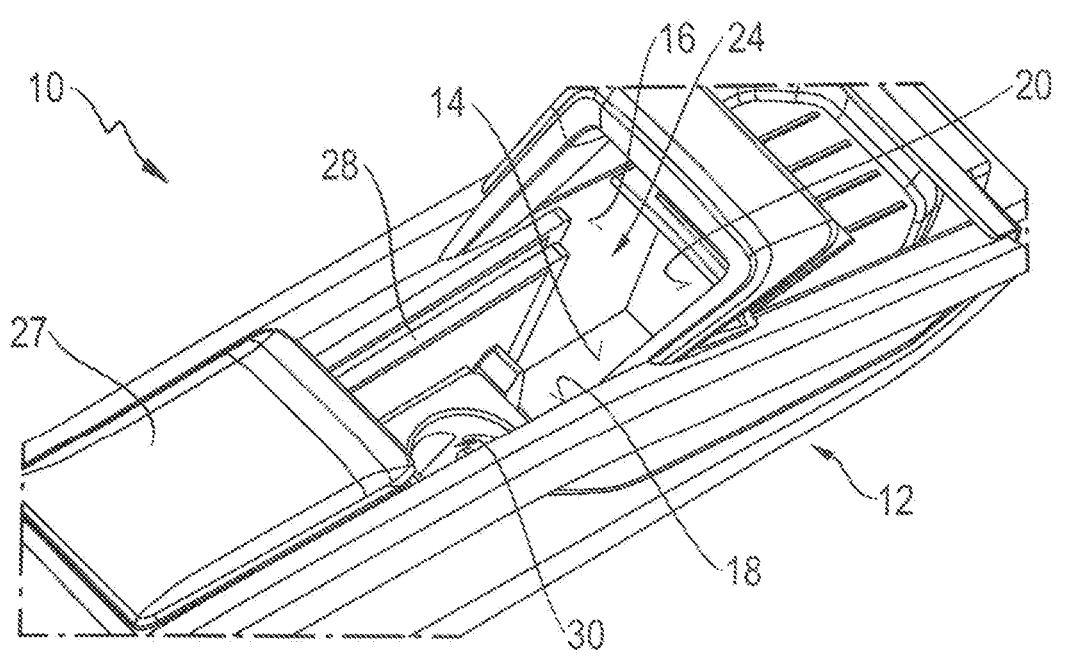
FIG. 2 is a schematic top perspective view of the storage device of FIG. 1 in a modified use situation.

The storage device 10 shown in FIG. 1 and FIG. 2 as a center console can be provided in an interior of a motor vehicle between a driver seat DS and a passenger seat PS and can store objects. The storage device 10 has a substantially cuboid storage compartment 12 for storing objects. The storage compartment 12 has a floor 14. A first side wall 16 and a second side wall 18 are connected to the floor 14 in a material-locking manner, in particular by welding. The first side wall 16 and the second side wall 18 also are connected to a front wall 20 and a rear wall 22, in particular by welding, and can define a storage volume 24 of the storage compartment 12. The storage compartment 12 can be closed by a cover 26 that can be displaced in the X-direction, for example, to enclose the storage volume 24. A charging outlet CO is provided in the front wall 20.

A tensioning belt 26, is configured, for example, as an elastomeric band and is provided on the first side wall 16 to store a flat device 28, such as a tablet computer, pressed flat against the first side wall 16. The flat device 28 can be inserted into a free space between the first side wall 16 and a cup holder 30 formed adjacent the floor 14. Surfaces on which the flat device 28 could hit with high acceleration forces are covered with a padding P made of a soft and/or elastic material to reduce the risk of damage to the flat device 28. Preferably, only those surfaces that the flat device 28 can hit are padded, while all other surfaces limiting the storage volume 24 are unpadded, i.e., not covered with a soft and/or elastic material.

The invention claimed is:

1. A storage device (10) for an interior of a motor vehicle, the storage device (10) having a storage compartment (12)

with an open top that is opened in a Z-direction for storing objects, the storage compartment (12) comprising:

a floor (14);

a first side wall (16) extending up from the floor (18) and lying substantially in an X-Z plane;

a tensioning belt (26) arranged in the storage compartment (12) at a position opposed to the first side wall (16) for pressing a flat device (28) against the first side wall (16) and for supporting weight forces of the flat device (28); and a padding P disposed on surfaces of the first side wall (16) and/or a floor region of the storage compartment (12) adjoining the side wall (16).

2. The storage device apparatus (10) of claim 1, wherein an elastic padding that can be provided by the first side wall (16) and a pressing force that can be provided by the tensioning belt (26) up to a predetermined maximum thickness of the flat device (28) are substantially in a force equilibrium in a storage position of the flat device (28) between the first sidewall (16) and the tensioning belt (26).

3. The storage device (10) of claim 1, wherein a storage volume (24) of the storage compartment (12) is limited in a Y-direction by the first side wall (16) and by a second side wall (18) that is spaced apart from the first side wall (16) in a Y-direction and lies substantially in the X-Z plane, wherein the first side wall (16) and the second side wall (18) define substantially planar inner sides in the X-Z plane.

4. The storage device (10) of claim 3, further comprising a fixture-free intermediate space between the first side wall (16) and the second side wall (18).

5. The storage device (10) of claim 1, wherein the padding (P) further is provided on a region of the floor (14) of the storage compartment (12) adjoining the side wall (16).

6. The storage device (10) of claim 1, further comprising a cup holder (30) projecting up from the floor (18) of the storage compartment (12) at a position offset from the first side wall (16) and the tensioning belt (26) in the Y-direction.

7. The storage device (10) of claim 6, wherein the padding (P) extends onto the floor (18) at positions between the first side wall (16) and the cup holder (30).

8. The storage device (10) of claim 1, wherein the padding (P) comprises at least one of an elastic material, a nonwoven material, a thermoplastic elastomer, a rubber material and a foam material, and wherein the elastic material is laminated with at least one of a fabric, a protective layer and a film.

9. The storage device (10) of claim 1, further comprising a cover (26) for selectively closing the open top of the storage compartment (12), the cover (26) being moveable between a closed position for closing the open top and an open position for accessing the open top.

10. The storage device (10) of claim 9, wherein the padding (P) further is provided on a region of the cover (14) adjoining the first side wall (16) when the cover (14) is closed.

11. The storage device (10) of claim 1, further comprising a charging structure in the storage compartment (12) for connecting and/or electrically charging the flat device (28).

12. An interior assembly for an interior of a motor vehicle having a driver seat (DS), a passenger seat (PS), and the storage device (10) of claim 1 provided in the −Y direction between the driver seat (DS) and the passenger seat (PS).

\* \* \* \* \*